United States Patent [19]

Harmon

[11] Patent Number: 5,645,289
[45] Date of Patent: Jul. 8, 1997

[54] CYLINDER SLED

[76] Inventor: Stanley B. Harmon, Williams Rd, R.R. 2, Box 166D, Alfred, Me. 04002

[21] Appl. No.: 679,651

[22] Filed: Jul. 12, 1996

Related U.S. Application Data

[63] Continuation-in-part of Ser. No. 434,279, May 3, 1995, abandoned.

[51] Int. Cl.$^6$ .................................................. B62B 15/00
[52] U.S. Cl. ........................................ 280/28.12; 280/19
[58] Field of Search ............................. 280/18, 18.1, 19, 280/19.1, 23.1, 24, 28.17, 28.18, 287.2; 441/32, 33, 34; 220/754, 757, 759, 770

[56] References Cited

U.S. PATENT DOCUMENTS

| | | | |
|---|---|---|---|
| 2,365,174 | 12/1944 | Cochran | 280/18 |
| 2,371,404 | 3/1945 | Mumford | 441/32 |
| 2,515,715 | 3/1950 | Jones | 441/32 |
| 2,681,809 | 6/1954 | Hamill | 280/28.12 |
| 3,110,914 | 11/1963 | Howell et al. | 441/32 |
| 3,436,775 | 4/1969 | Schlosser et al. | 441/33 |
| 3,746,357 | 7/1973 | Haskins | 280/24 |
| 4,285,529 | 8/1981 | Vaillancourt . | |
| 4,389,066 | 6/1983 | Weir et al. . | |
| 4,438,940 | 3/1984 | Hunt | 280/28.12 |
| 4,928,983 | 5/1990 | Maass | 280/18 |
| 5,119,752 | 6/1992 | Doherty | 280/24 |
| 5,251,921 | 10/1993 | Daniels | 280/28.12 |

FOREIGN PATENT DOCUMENTS

| | | | |
|---|---|---|---|
| 86573 | 11/1955 | Norway | 280/19 |

*Primary Examiner*—Brian L. Johnson
*Assistant Examiner*—Min Yu
*Attorney, Agent, or Firm*—Chris A. Caseiro; Thomas L. Bohan

[57] ABSTRACT

A sled-like container designed to be dragged over a variety of terrain. The sled-like container includes a cylindrically-shaped sled body, a tapered front portion forming one end of the sled body, and an access port for inserting or removing matériel in a storage space defined by the interior of the sled body. When in use, the sled body is completely closed so as to protect equipment, etc., in the storage space. The tapered front end of the sled body may be openable for additional access. The sled body may be smooth or it may include a ribbed configuration. An optional releasable pulling attachment may be used to connect the sled to the person pulling the sled.

16 Claims, 3 Drawing Sheets

CYLINDER SLED

This is a continuation-in-part of application Ser. No. 434,279, filed May 3, 1995, now abandoned.

BACKGROUND OF THE INVENTION

1. Field of the Invention

The present invention relates to a container designed to be dragged over the snow. In particular, the present invention relates to a container for transporting cargo such as camping gear, food, tools, cooking utensils, and the like. More particularly, the present invention relates to a container for transporting cargo which encloses the cargo and protects the cargo from rain, snow, and other bad weather. The container is cylindrically-shaped and has no runners, thus avoiding the snow-collection problems of traditional and runner-equipped sleds. Even more particularly, the present invention relates to a sled-like container that is easy to load, that tracks better in the snow when being pulled, that eliminates the problems associated with tipping and rollover, and that is much less likely to get caught on bushes, trees, and debris on the surface with which it is in contact.

2. Description of the Prior Art

Hand-drawn sleds remain one of the most popular and practical means for transporting cargo and people in regions receiving significant amounts of snow. Runners, which generally help to reduce the drag on a sled as it is pulled through the snow, are currently used on most sleds. These traditional sleds will usually use at least two runners to properly distribute and support the weight of the cargo within or on top of the sled. Others have added pivoting runners to the front of the sled in order to facilitate steering of the sled. Still other sleds made of material such as wood, metal, or plastic have the entire bottom in contact with the snow so as to minimize how deep the sled will sink into soft snow. Winter hikers, cross-country skiers, snowshoers, etc., are more likely to use this type of sled for carrying their cargo and supplies. Currently, winter hikers use "open" sleds. That is, a sled without some type of cover. Some hand-drawn open sleds are designed and sold specifically for this purpose. However, most winter hikers tend to use plastic sleds generally seen in children's toy stores.

Several disadvantages and problems are associated with open sleds. For instance, they tip over fairly easily. Sometimes they tip over even on relatively flat land when they encounter a small bump or depression in the snow. More often, they roll over on a downhill portion of a trail because the increase in speed associated therewith magnifies the effect of any irregularity in the surface of the snow. The higher the speed, the greater the odds of a rollover. Such rollovers cause the load to shift and ties to loosen such that the load has to be pulled back into place and re-secured by the hiker so as to rebalance it. This increases lost time spent rearranging the cargo. In addition, if the sled is being pulled by poles instead of a rope, the hiker has to unfasten the harness used for attaching the poles to himself in order to work on the sled. This tipping problem compounds the initial time-consuming task of carefully arranging the items on the sled and lashing them in place. The concern here is to keep the center of gravity low so as to reduce the chance of tipping and to minimize load shifting. The effort spent in the first sled packing is defeated by the inherent likelihood of tipping. This problem can be very frustrating for the hiker and his/her companions, particularly in cold weather.

Another problem associated with all of the prior-art open sleds is that they will collect snow as they are being pulled through the snow. In fact, as much as two to three pounds of snow can accumulate on the sled. This is especially important since hikers go to great expense trying to keep the total weight of gear and supplies as low as possible. The heavier the sled, the slower the hiker will be, the shorter the distance the hiker can cover in a given time period, and the greater the amount of energy that must be expended.

Another concern that must be addressed by hikers is the exposure of the gear and supplies to varying foul-weather conditions. Open streams must be crossed. A warm day may bring rain or melt snow into puddles. Throughout all of the weather conditions experienced, it is essential for the hiker to keep sleeping bags, clothing, and other critical equipment dry. Tarps and covers made of sheeting such as nylon, plastic, and the like may be used. However, their use is not always effective in keeping the gear and supplies dry. Their use also increases the overall weight of the sled-countering the hikers' effort to minimize weight. Moreover, this necessary task of sealing equipment retained in the open sled increases the time required to prepare for the hike and reduces the time available for hiking. Of course, if and when tipping occurs, it is often necessary to repeat the time-consuming sealing procedure.

On narrow trails roots, bushes, or small trees are often trapped between the rope or shafts used to pull the sled. They are also caught on the sled itself. For any hiker who has engaged in winter hiking using a sled to transport gear and supplies, this is a common and aggravating problem. The sudden stop is unpleasant, and when it occurs at speeds greater than a walk, something may break, necessitating time-consuming on-site repairs. In open sleds that use dual shafts to pull the sled, the skier's movement sometimes imparts twisting forces down the shafts, causing the sled to oscillate and increasing the energy required to stabilize the sled.

Prior-art devices have addressed a variety of the concerns related to open and/or runnered sleds. None specifically addresses all of the problems faced by winter hikers. U.S. Pat. No. 4,389,066 (1983, Weir et al.) describes a rescue unit that includes a frame and attached skis, adapted to be towed by a snowmobile. The Weir device includes a patient-support section carried by the frame. It also includes a hinged cover having a telescopically movable section. An attendant support section forms part of the frame.

U.S. Pat. No. 4,285,529 (1981, Vaillancourt) describes a sled for transporting passenger or cargo, especially small children and infants. The Vaillancourt device includes a passenger-receiving enclosure having a base and a cover that is rotatably connected to the runners of the sled.

The noted prior-art devices offer some means for enclosing a person or other contents carried on a sled. However, they are not particularly helpful to winter hikers who must operate on a smaller scale. Specifically, the prior devices are used as a means for transporting injured skiers from locations inaccessible to wheeled vehicles or for transporting cargo and children on short outdoor walks, shopping trips, and excursions. These devices usually employ runners or skis as the gliding surface contacting the snow. These runners or skis collect unwanted snow and change the center of gravity of the unit, thereby increasing the tendency that the unit will turn over. Further, the runnered sleds are more likely to get hung up on trees, roots, bushes, and other forest debris.

Therefore, what is needed is a container designed to be dragged over snow like a sled. What is also needed is a sled-like container that protects gear and supplies from inclement weather. What is yet further needed is a sled-like container that is lightweight and has no runners or skis upon which snow can collect. What is still further needed is a sled-like container designed to minimize, if not eliminate, the problems associated with tipping and/or rollover. Finally, what is needed is a sled-like container that is easy to load, that tracks well in the snow when being pulled, and that resists getting tangled or hung up on trees, roots, bushes, and various types of debris.

SUMMARY OF THE INVENTION

It is an object of the present invention to provide a container designed so that it can be dragged over snow. It is another object of the present invention to provide a sled-like container which protects gear and supplies from bad weather, like rain and snow. A further object of the present invention is to provide a sled-like container that is lightweight and does not use runners or skis upon which snow can collect. A still further object of the present invention is to provide a sled-like container which is easy to load, which tracks better in the snow when being pulled, which resists tangling or hanging up on roots, bushes, and shrubs, and which does not cause problems for the user if the container rolls over.

The sled-container device of the present invention includes a main cylinder body, one or more access ports, a tapered front section, and pulling means. The access port may be located at a rear section of the sled and it may be protected with a back cover. The main cylinder body is preferably made of a high-density plastic such as acrylic, polycarbonate, high molecular weight polyethylene or polypropylene, or any other viscoelastic material capable of withstanding harsh weather conditions, including exposure to sunlight. Metal components may also form a substantial portion of the body. If necessary, the cylinder body may be made of some combination of these or similar materials. The cylinder body can have a variety of surface characteristics and coatings which are designed to enhance its usefulness under the conditions typically experienced. For instance, the external surface design of the cylinder body can be smooth or ribbed. A ribbed design can limit the flexibility of the material used to make the main body, making the sled track better on firm snow. It is generally desirable to use thinner materials to fabricate the cylinder body so as to minimize its weight. Of course, thinner materials tend to be more flexible. Forming the body with convolutions would limit that flexibility. A coating may be applied to the exterior of the cylinder body so as to reduce friction arising between the cylinder body and the surface over which it is being pulled. The coating may be any suitable substance having a low coefficient of friction, such as wax or a low- or high-density tetra-fluoro hydrocarbon, including, but not limited to, the product identified by the trademark TEFLON.

Although the sled is preferably designed substantially as a cylinder, it can be formed in a variety of stable shapes in a variety of dimensions. The outer surface of the sled can also have a variety of shapes ranging from a completely smooth surface to one having a ribbed, curved design, as previously noted.

The back cover of the device is preferably designed to be removably connectable to the back end of the cylinder body so as to create an access port to the inside of the cylinder body. It can also be permanently affixed to or formed as a permanent part of the cylinder body if the inside of the cylinder body is accessible through the front of the sled. If removable from the cylinder body, the back cover can be secured by a variety of means. For example, the securing means used for the back cover may have a variety of designs such as a threaded design, a twist-and-lock design, a snap-fit design, and the like. Furthermore, the back cover may have a tether line connecting it to the cylinder body, thus preventing the back cover from completely separating from the cylinder sled in the event of an accident or when retrieving something from the sled while on hilly terrain. The back cover can be made of the same material as the cylinder body, and it may be designed such that it serves as a seat for the hiker to use when camping or stopping for a rest. The back cover may alternatively be formed of a more flexible material, such as a pack cloth fabric made of coated cotton, nylon, polypropylene, and the like. A zipper, or hook-and-loop combination forming part of such an alternative flexible back cover, would provide easy access to the interior of the sled body.

While the interior of the sled is preferably accessed through this back cover, a combination access section may be used. That access section may be a portion or all of the back cover in addition to a separable section of a portion of the cylinder body itself. The access section may be created in any of a variety of ways so as to provide easy access to the interior of the sled body.

The nose-cone component of the device may be removably connectable to the front end of the cylinder body, provided its attachment to the cylinder body is sufficient to withstand the forces exerted on that interface. However, the nose-cone component preferably forms a permanent part of the cylinder body, such as with permanent attachment means like adhesive, rivets, etc. It may also be formed as an extension of the cylinder body so as to create a unitary piece. If the nose-cone component is removably connected to the cylinder body it allows for additional access to the contents of the cylinder sled. The nose-cone component may be made of the same or similar material as the cylinder body.

While any number of well-known means for joining the pulling means to the sled portion of the device may be used, it is preferable to have a pivoting or otherwise rotatable connecting means attached to the nose-cone portion of the sled. This connecting means can either be the pulling means, or it can be the means by which the pulling means links the hiker to the sled. The pulling means is preferably a rope or nylon strap that is detachably connectable to the connecting means. The connecting means in conjunction with the pulling means is designed to link the center of the cylinder body with the effective center of the hiker's body-the hiker's waist. By centering the connecting/pulling means on the hiker's waist, the present invention reduces the translation of hiker body movement to swaying of the pulled sled. The use of a rotatable connecting means limits twisting of the pulling rope or strap.

A distinct advantage of the present invention involves a tapering of the front portion of the cylinder. Such tapering and the cylindrical design greatly reduces the likelihood that the sled will get hung up on roots, bushes, shrubs, small trees, and the like, while winter hiking. The use of a single centered pulling means connected between the sled and the skier minimizes the transfer of twisting forces down the pulling means to the sled, thus minimizing oscillation of the sled when the skier moves. These and other advantages of the present invention will become apparent upon review of the detailed description, the drawings, and the appended claims.

DETAILED DESCRIPTION OF PREFERRED EMBODIMENTS

Figure 1:
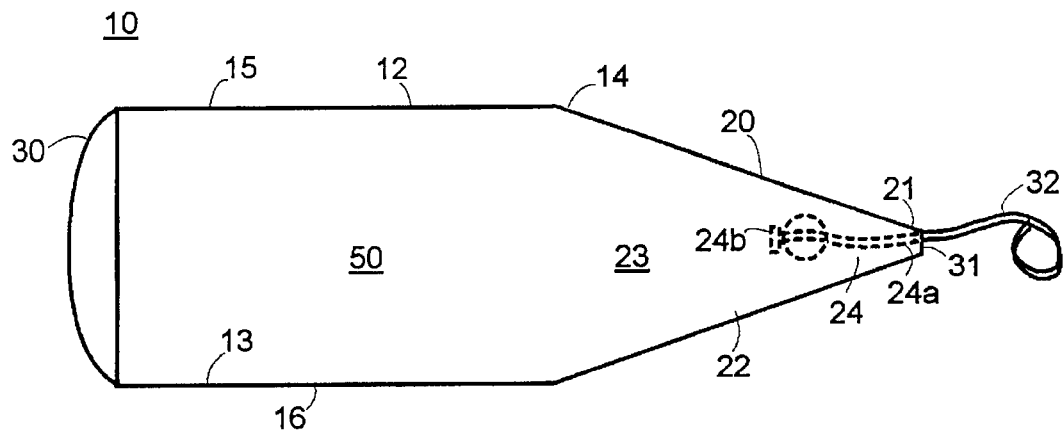
FIG. 1 is a side view of the present invention showing the pulling means, the back access cover of the sled, and the cylinder body.
Figure 2:
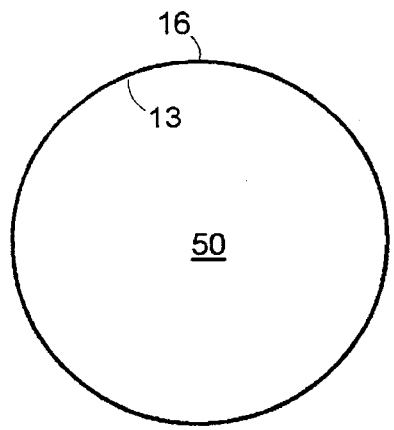
FIG. 2 is a cross-sectional view of the main section of the cylinder body of the present invention.

The preferred embodiment of a cylinder sled 10 of the present invention is illustrated in FIGS. 1–2. The cylinder sled 10 includes a main sled body 12, a front nose section 20, and a back cover 30. The sled body 12 has a cylindrical shape having an inside body surface 13, an outside body surface 16, a front body end 14, and a back body end 15, all of which, when taken together, define a storage space 50. The inside surface 13 is preferably of the same configuration as the outside body surface 16. In the preferred embodiment of the invention, those surfaces are smooth.

The sled body 12 is preferably made of a high-density plastic such as acrylic, high-molecular-weight polyethylene, polypropylene, polycarbonate, or the like, or some combination of these or similar materials. Although other materials such as metal and fiberglass can be use, the preferred material for the present invention is high-density polyethylene. The material selected for fabrication of the sled body 10 and the other components of the sled 10 are preferably as light, strong, and abrasion resistant as possible. In addition, the sled body 12 can have a variety of coatings, including, but not limited to, a tetra-fluoro hydrocarbon coating, to enhance the ability of the sled 10 to slide over various terrains.

The front nose section 20 has a tip portion 21, a tapered portion 22, and a sled-body end 23. In the preferred embodiment of the invention, the front nose section 20 and the main sled body 12 are formed as a unitary piece. Optionally, those two regions may be detachably connectable separate sections wherein the sled-body end 23 connects to the front body end 14 of sled body 12 by way of some type of connection means, such as by adhesive bonding, riveting, interlaminar fabrication, and the like. However, such connection must be sufficient to withstand the rigors to be expected under the conditions of use noted. The taper of the tapered portion 22 can be varied as desired, but it is preferable that the included angle be between about 50° and about 70°. The tip portion 21 has connecting means 24 therein for linking the sled 10 to the user.

The back cover 30 may be formed of the same material used to produce the main sled body 12. Alternatively, it may be a nylon or canvas fabric joined to the back body end 15 and having a rear access port so as to provide access to the storage space 50. The back cover 30 may be slightly smaller in diameter than the sled body 12, and is preferably of the same cross-sectional shape as the sled body 12 for minimizing the problems associated with hanging up on the various types of debris earlier noted.

Figure 3:
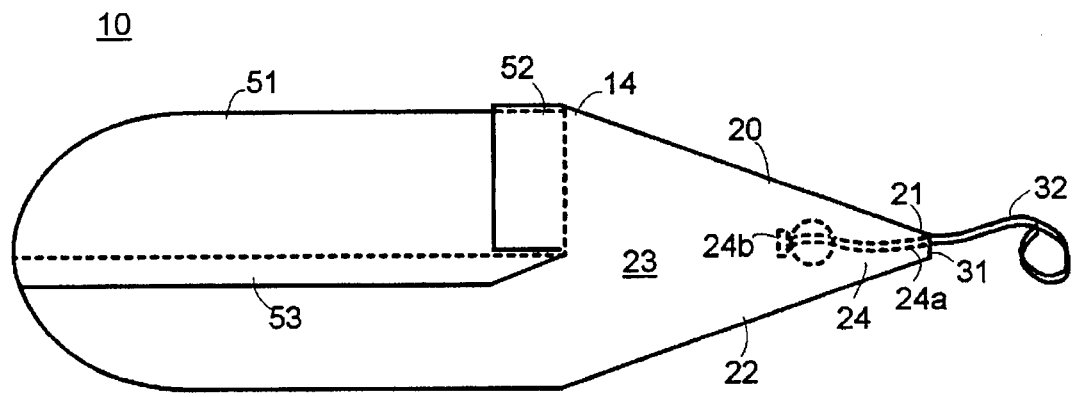
FIG. 3 is a side view of the present invention showing an alternative access port forming a portion of the main cylinder body.

In an alternative embodiment of the present invention shown in FIG. 3, the back cover 30 is replaced as the means for accessing the storage space 50 with a larger access section 51 forming part of the back body end 15 and a portion of the main cylinder body 12. A first access flap 52 of the front body end 14 overlaps and is secured to the access section 51 by securing means such as a zipper, snaps, etc. A second access flap 53 forms a part of the lower region of the main cylinder body 12 and similarly overlaps and is secured to the access section 51 in the manner noted. Design of the sled 10 with the larger access section 51 permits the user much easier access to the storage space 50 than is available through the back cover 30. The access section 51 is slidably removable and insertable within the two flaps noted.

The connecting means 24 of the present invention includes a first end 24a and a second end 24b, as shown in FIGS. 1 and 3. The second end 24b is designed to fit within the tip portion 21 so that the connecting means 24 is retained therein. The connecting means 24 may be any type of device, such as a crossing bar, or a ball, as shown in the drawings. The first end 24a of the connecting means preferably is smaller than a front end opening 31, which in turn has a smaller cross section than the second end 24b. First end 24a may be a rope, band, tab, etc., that is attachable to the second end 24b and to pulling means 32. With the first end 24a designed as noted, the connecting means 24 can rotate freely within the tip portion 21. This allows the cylinder sled 10 to rotate while being dragged without causing a twisting effect on the pulling means 2, which may be a simple piece of rope. The first end 24a attaches to the pulling means 2 and the second end 24b is preferably a ball located on the inside of nose-cone component 20 that prevents the connecting means 24 from disconnecting from or sliding out of tip portion 21.

Figure 4:
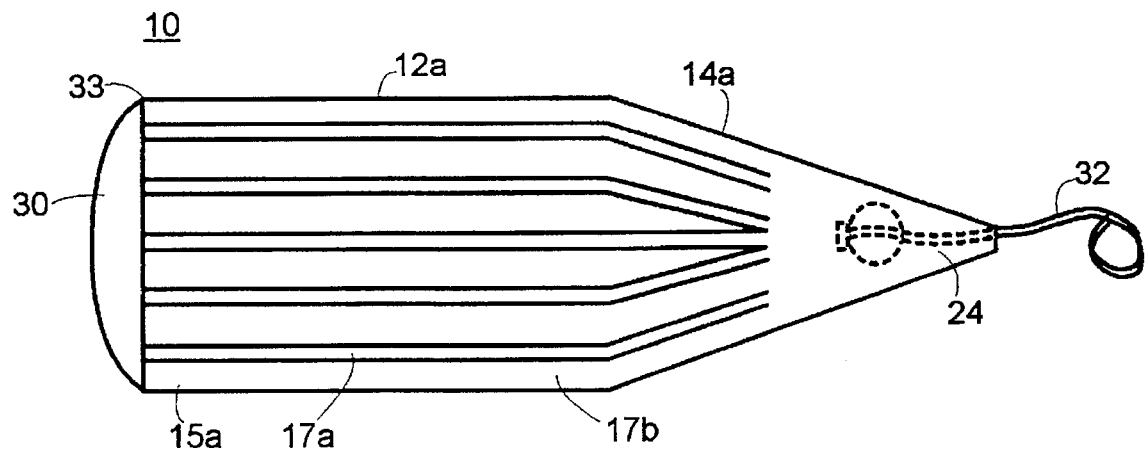
FIG. 4 is a side view of an alternative embodiment of the present invention showing the scalloped, external surface of the cylinder body.
Figure 5:
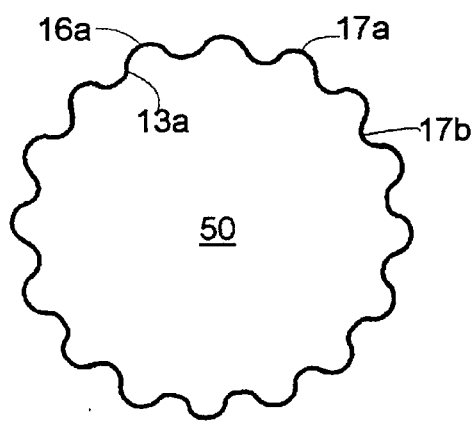
FIG. 5 is a cross-sectional view of the alternative embodiment of the present invention showing the scalloped, external surface of the cylinder body.

As noted, the preferred embodiment of the sled body 12 provides for a smooth surface in a cylindrical configuration. However, as shown in FIGS. 4 and 5, the sled 10 may be alternatively designed with a ribbed main cylinder body 12a, a ribbed front body end 14a, and a ribbed back body end 15a. The ribbed regions form a ribbed outside body surface 16a and a ribbed inside body surface 13a. The ribbed sections include a plurality of crest portions 17a and trough portions 17b. This alternative shape of the cylinder body 12a is designed to permit the fabricator to use thinner-and therefore lighter-materials while retaining rigidity for structural purposes, thereby reducing weight of the sled 10 without reducing structural integrity.

As previously noted, the pulling means 2 may be a piece of rope. A preferable alternative design of the pulling means 2 is one that includes release means such that when excess tension is exerted on the hiker or the sled 10, a portion of the pulling means 2 will part from the hiker. Painful sudden stops would thereby be avoided. In addition, catastrophic damage to the sled 10 would be avoided. Since catastrophic damage can be avoided through the use of release means as part of the pulling means 2, the sled 10 may be fabricated using thinner components, thereby reducing the weight to be pulled by the hiker.

Figure 6:
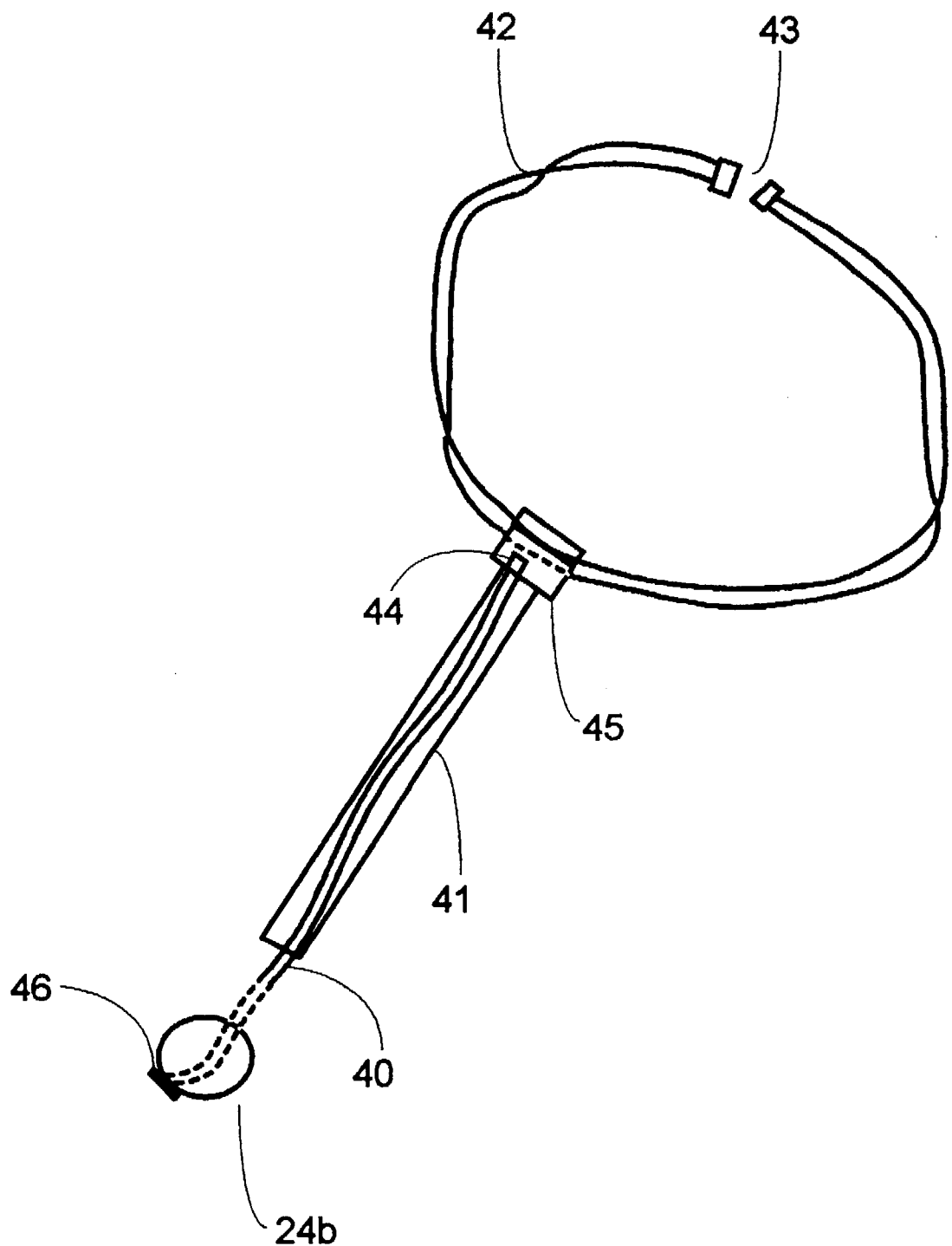
FIG. 6 is a top view of an alternative sled pulling device.

As illustrated in FIG. 6, the alternative pulling means includes a flexible attachment piece 40 that may be rope, a strap, nylon webbing, or similar material. The attachment piece 40 is contained within a rigid member 41 that may be clear or opaque plastic tubing, or it may be metal. A waist belt 42 that may be removably affixed about the waist of the hiker with a belt release device 43 that can be a side-release buckle or a simple hook-and-hole arrangement. The waist belt 42 is releasably coupled to a first attachment end 44 of the attachment piece 40 with an attachment release device 45 that may also be a side-release buckle modified to release under tension exceeding some design value. A second attachment end 46 of the attachment piece 40 is connected to the first end 24a of the connecting means 24 in a way that ensures the attachment release device 45 will release before the second attachment end 46 parts from the first end 24a of the connecting means 24. A bar slide has been found to be suitable for this purpose. Sufficient extended, or sudden, force applied to the attachment release device 45 caused by tension on the attachment piece 40 causes the release device 45 to part, thus disconnecting the hiker from the sled 10. Moreover, it has been observed that the rigid member 41 moves back into the front end opening 31 when the user moves slower than the sled 10, provided the outside diameter of the rigid member 41 is smaller than the inside diameter of the front end opening 31. When this occurs, the interface between the front body end 14 and the pulling means is fixed, eliminating any pivoting at that juncture. This effect substantially restricts the tendency of the sled 10 to stray off course when the user slows down—a particular concern when traveling downhill with current pulling devices.

While member 41 has been described as a rigid element in that it must be stiff enough to force the sled 10 to move with the user, it is to be understood that that structural member may be "semi-rigid." That is, it may have sufficient stiffness to ensure that the sled 10 will follow, but not catch up with, the user. It must also have sufficient flexibility so that some of the force of the movement of the sled 10 will be absorbed rather than transferred directly to the user, and so that it will exit the sled 10 at the front nose section 20 and bend enough to be able to be attached to the mid-section of the user. In that regard, a relatively stiff viscoelastic material, such as LEXAN(TM) may be used to form member 41. The semi-rigid member 41 would similarly be designed to be inserted into the front end opening 31 of the front nose section 20 so that it is movably retained therein.

It has also been observed that fabrication of the attachment piece of some energy-absorbing material such as a relatively soft viscoetastic material, rather than the less-elastomeric webbing previously noted, may further reduce the strain on the user by dampening the effects of movement of the sled 10. A material such as rubber roping may be used in that regard. Of course, other suitable means for securing the sled 10 directly to the belt 42 may be used.

Although the cylinder sled 10 may be made in a variety of sizes, the preferred design of the present invention has a sled body 12 approximately 16 inches in diameter for 30 inches of its length. It tapers to a one-inch diameter at the front of the front nose section 20, for an overall length of approximately 48 inches. For the scalloped design shown in FIGS. 4 and 5, there may be 20 ribs or scallops equally spaced around the outside surface 16a of the sled body 12a. In this scalloped version, the back cover 30 has an exposed section 33 that may extend an additional inch or two beyond the end of the main sled body 12a, thereby creating a cylinder sled 10 having an overall length of approximately 49–50 inches.

The cylinder sled 10 may be used to store the winter hiker's gear and supplies and to protect the gear and supplies from the weather. The single-pulling means 2 of the cylinder sled 10 may be held by, or attached to, the winter hiker. The outside surface 16, with or without ribs or convolutions, results in the cylinder sled 10 "tracking" behind the hiker better than currently available open sleds, consequently reducing the drag caused by the sled. There is less tendency of the cylinder sled 10 to veer to the left or right of the skier's track. Also, the tapered shape of the nose-cone component 20 is much less likely to catch on anything, thereby making winter hiking/skiing less aggravating and more enjoyable. Because late winter hikers may encounter various types of terrain, the sled-like container of the present invention is designed to allow any portion of the outside surface 16 to act as the gliding surface contacting snow, mud, soil, and the like.

Although the preferred embodiment of the present invention has been described herein, the above description is merely illustrative. Further modification of the invention herein disclosed will occur to those skilled in the respective arts and all such modifications are deemed to be within the scope of the invention as defined by the appended claims.

What is claimed is:

1. A sled container designed to be dragged over various types of terrain, said sled container comprising:

a. a cylindrically-shaped main body;

b. a tapered front section coupled to said cylindrically-shaped main body;

c. an access section for accessing an interior storage space of said cylindrically-shaped main body, wherein said access section forms a portion of said cylindrically-shaped main body; and d. coupling means for detachably coupling said tapered front section to a belt of a sled-container user, wherein said coupling means includes a flexible attachment piece located within a rigid stand-off member, wherein a first end of said flexible attachment piece is coupled to said tapered front section by connecting means retained within said front tapered section, wherein said connecting means couples said first end of said flexible attachment piece to said tapered front section such that said sled container is free to rotate without causing a twisting of said flexible attachment piece, wherein said rigid stand-off member may fit into said tapered front section, and wherein a second end of said flexible attachment piece is releasably couplable to an attachment release device that is couplable to said belt.

2. The sled container as claimed in claim 1 wherein said sled container wherein said access section is a back cover connected to a rear section of said cylindrically-shaped main body.

3. The sled container as claimed in claim 2 wherein said back cover component is detachably connected to said rear section of said cylindrically-shaped main body.

4. The sled container as claimed in claim 2 wherein said tapered front section is cone-shaped.

5. The sled container as claimed in claim 2 wherein said tapered front section is detachably connected to said cylindrically-shaped main body.

6. The sled container as claimed in claim 1 wherein said flexible attachment piece is a rope.

7. The sled container as claimed in claim 6 wherein said connecting means retained within said tapered front section is a ball through which said rope passes, wherein said ball is of a diameter greater than a diameter of an opening of said front tapered section through which said rope passes, wherein said first end of said rope is attached to said ball by means of a bar slide.

8. The sled container as claimed in claim 1 wherein said main body and said tapered front section are of a ribbed design.

9. The sled container as claimed in claim 8 wherein said ribbed design of said main body and said tapered front section includes a plurality of crest portions and a plurality of trough portions, each one of said trough portions being alternatingly spaced between adjacent crest portions.

10. The sled container as claimed in claim 1 wherein said access section includes a removable portion of said main body, said main body including a fixed section having means for detachably retaining said removable section thereto.

11. The sled container as claimed in claim 1 wherein said sled body is made from a high-density plastic.

12. The sled container as claimed in claim 1 wherein said attachment release device is designed to detach said flexible attachment piece from said belt under predetermined stress conditions.

13. A sled designed to be dragged over various types of terrain, said sled comprising:

a. an essentially cylindrically-shaped main body;

b. a tapered front section coupled to said cylindrically-shaped main body;

c. an access section for accessing an interior storage space of said cylindrically-shaped main body, wherein said access section forms a portion of said cylindrically-shaped main body; and d. coupling means for detachably coupling said tapered front section to a belt of a sled-container user, wherein said coupling means includes a flexible attachment piece located within a semi-rigid stand-off member, wherein a first end of said flexible attachment piece is coupled to said tapered front section by connecting means retained within said front tapered section, wherein said connecting means couples said first end of said flexible attachment piece to said tapered front section such that said sled container is free to rotate without causing a twisting of said flexible attachment piece, wherein said semi-rigid stand-off member may fit into said tapered front section, and wherein a second end of said flexible attachment piece is releasably couplable to an attachment release device that is couplable to said belt.

14. The sled as claimed in claim 13 wherein said flexible attachment piece is fabricated of a viscoelastic material.

15. The sled as claimed in claim 13 wherein said access section is a back cover connected to a rear section of said cylindrically-shaped main body.

16. The sled as claimed in claim 15 wherein said back cover component is detachably connected to said rear section of said cylindrically-shaped main body.

* * * * *